Dec. 4, 1956 K. W. BINDING 2,772,824
AUTOMOBILE TOP CARRIER FOR ELONGATE ARTICLES
Filed Sept. 23, 1953 2 Sheets-Sheet 2
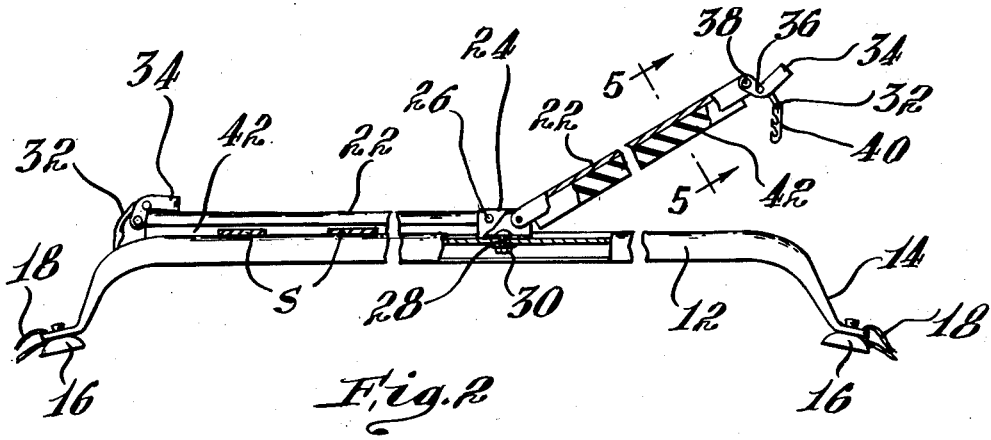
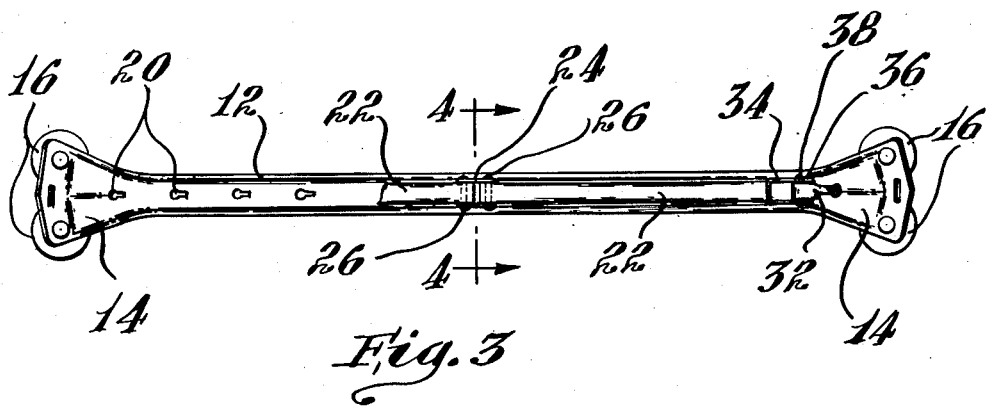
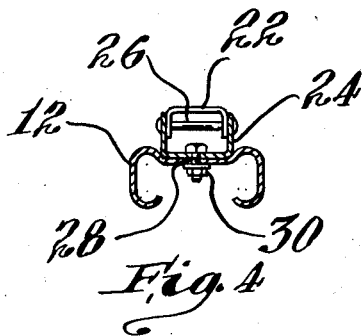
Inventor
Kenneth W. Binding
by Roberts, Cushman & Grover
Att'ys.

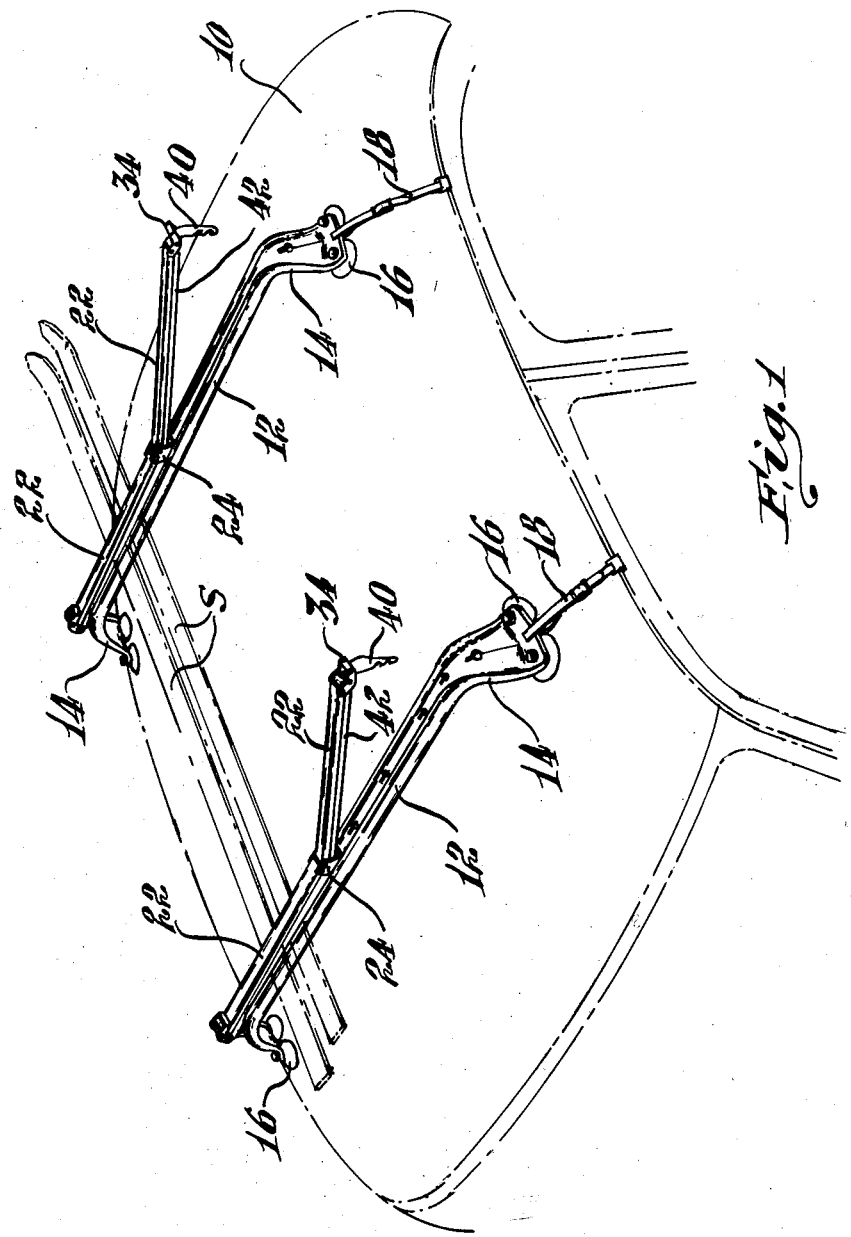

United States Patent Office 2,772,824
Patented Dec. 4, 1956

2,772,824

AUTOMOBILE TOP CARRIER FOR ELONGATE ARTICLES

Kenneth W. Binding, Medford, Mass., assignor to Leo M. Beckwith, Brookline, Mass.

Application September 23, 1953, Serial No. 381,783

4 Claims. (Cl. 224—42.1)

This invention relates to automobile top carriers and more especially to improvements in automobile top carriers of the kind disclosed in my pending application for patent Serial No. 342,925 filed March 7, 1953, and now abandoned.

As therein illustrated the carrier consisted of a pair of longitudinally spaced rigid carrier bars having vertically offset legs and feet at their opposite ends adapted to rest on the automobile top to hold the bars spaced from and parallel to the top of the automobile, fastening means at their ends for securing the bars in place and a plurality of apertures distributed along the bars for accommodation of fastening means with which to lash or bind articles mounted across the bars.

The principal objects of this invention are to provide a special attachment or assembly for use with carrier bars of the aforesaid kind thereby fitting them especially for mounting elongate articles, which can be easily and quickly attached to the carriers or removed therefrom, without substantial change or modification thereof so that the carrier may quickly be converted to a mount for elongate articles and as quickly restored to its original use, which in use are effective and positive in their clamping action and yet may be clamped and released with a minimum effort and manipulation, which will not mar or otherwise damage the articles clamped and which when removed may be folded into a small compact package for storage. Other objects are to provide a very simple, durable and easily fabricated attachment which affords an attractive and inexpensive adjunct for car top carriers.

As herein illustrated the attachment comprises one or more keeper bars pivotally attached at one end to each carrier bar so as to extend along the carrier bar substantially parallel thereto and a latch at the free end engageable with an aperture in the carrier bar to lock the keeper bar in parallel relation thereto. Preferably two keeper bars are used and are pivotally joined at their adjacent ends to a bracket, the latter having an attaching element associated therewith for engagement with an aperture in the carrier bar so as to make it fast thereto. The pivoted ends of the keeper bars are elevated sufficiently so that the undersides thereof do not have direct contact with the supporting surface of the carrier bar when they lie parallel thereto. The latches are joined to the free ends of the bars by toggles which are arranged to extend the latches for engagement with apertures in the ends of the carrier bar and then to retract them into locking engagement therewith. To secure clamping without damage to the articles yieldable means is placed between the keeper bars and the carrier bars. Preferably the yieldable means is mounted at the underside of the keeper bars and for convenience the latter are channel shaped so as to receive the yieldable means with an edge projecting from the undersides. Sponge rubber or equivalent material may be employed and may be secured in the channels with adhesive or other suitable fastening means.

The invention will now be described in greater detail with reference to the accompanying drawings wherein:

Fig. 1 is an isometric view of the top of an automobile with the carrier bars attached thereto and with the keeper assemblies mounted on the carrier bars;

Fig. 2 is a side elevation of an automobile top carrier and the attachment partly in section;

Fig. 3 is a plan view looking down at the top of Fig. 2;

Fig. 4 is a transverse vertical section taken on the line 4—4 of Fig. 3; and

Fig. 5 is a transverse vertical section taken on the line 5—5 of Fig. 2.

Referring to Fig. 1 there is shown a portion of the tonneau of an automobile to the top 10 of which are attached in spaced relation a pair of automobile top carrier bars 12 which correspond to those described in my pending application, Serial No. 342,925 mentioned above. Briefly these carrier bars 12 are comprised of rigid rolled metal sections having at their opposite ends vertically offset legs terminating in feet 14 adapted to support them in spaced parallel relation to the top of the automobile. The feet 14 as described in the aforesaid application are splayed at their ends to receive vacuum cup elements 16 which serve to cushion contact of the feet with the top and to assist in holding them in place. Web straps 18 are looped through slots in the feet and have attaching hooks at their extremities for engagement with the gutters along opposite sides of the automobile top thereby to secure the carrier bars in place. The carrier bars 12 as further pointed out in the previous application were provided with a series of keyhole slots or apertures 20 for receiving keys attached to the ends of straps or ropes thereby to provide for lashing articles placed astride the carrier bar thereto.

In accordance with the present invention a special attachment or assembly is provided for adapting the carrier bars especially to mounting elongate articles such as skis, fish poles and the like thereon. The attachment comprises one or more keeper bars 22 preferably two mounted on each of the carrier bars 12 end to end so as to lie substantially parallel to its upper supporting surface and to have pivotal movement about horizontal axes from the parallel position to an angular position elevated from the supporting surface of the carrier bars. To this end adjacent ends of the keeper bars 22 are pivotally connected to a U-shaped bracket 24 by means of pivot pins 26 fastened crosswise of the bracket to the walls thereof. The bottom of the bracket may have attached thereto a threaded stem 28 which may be passed downwardly through one of the apertures 20 in the carrier bar preferably the one located midway between its opposite ends and has threaded on its lower end a nut 30 by which the bracket is made fast to the carrier bar. Alternatively the bottom of the bracket may have a hole through it for reception of a bolt which may be passed through it and an aperture in the carrier bar and have a nut applied to its lower end. Each keeper bar 22 extends from its pivot outwardly along the carrier bar so that it is substantially coextensive with the upper supporting surface thereof and has pivotally connected to its outer extremity a latch 32. The latch is connected to a toggle element 34 by means of a pin 36 and the toggle is in turn connected to the keeper bar by a pin 38. By rotating the toggle 34 in a clockwise direction as seen in Fig. 2 about its pivot pin 38 the pivot pin 36 of the latch 32 may be moved about the pivot pin 38 of the toggle as a center to extend the latch so as to engage its toothed end 40 with the aperture 20 which is located in the leg at the end of the carrier bar Fig. 2.

After engagement the toggle element 34 is rocked in a counterclockwise direction to draw the latch into locking position and to move the pivot point 36 beyond the center of rotation 38.

In order to prevent damage to articles mounted between the carrier bars and the keeper bars a cushion 42 is placed therebetween. Preferably the lower sides of the keeper bars are spaced from the surfaces of the carrier bars when they are parallel thereto either by elevation of the pivot pins 26 or by making the keeper bars narrower than the vertical distance from the surfaces of the carrier bars to the axes of the pins 26. The cushion 42 consists of a body of yieldable material and interposed in the gap so that it will have yieldable contact with at least one side of the articles resting on the carrier bars. Preferably the cushions are mounted on the keeper bars and to this end the latter are made channel shaped (Figs. 4 and 5) and the cushions which may be in the form of strips of soft rubber or equivalent material are set into the channels with portions thereof protruding from the undersides. Adhesive or other fastening means may be employed for securing the strip in place. As shown at the left-hand side of Fig. 2 when a pair of elongate articles such as skis S are clamped between the carrier elements and the keeper arms they become embedded in the cushion 42 which holds them securely in place without bringing the metal edges of the keeper bars into direct engagement therewith thus removing the chance of marring or marking their surfaces.

From the foregoing description it is evident that the assembly which consists of the bracket 24, keeper bars 22, latches 32 and toggles 34 may be attached or removed as a unit from the carrier bars so as to quickly convert the carrier bars for mounting elongate articles and as quickly to restore them for use for other purposes, that the device may be folded into a compact package when removed so that it may be stored in the trunk of a car or some other convenient place, and that it is of simple construction.

It should be understood that the present disclosure is for the purpose of illustration only and that this invention includes all modifications and equivalents which fall within the scope of the appended claims.

I claim:

1. For attachment to a pair of unitary rigid article carrier bars for automobile tops which bars when mounted on an automobile top are in spaced parallel relation and extend transversely of the top, the bars having bridge portions intermediate their ends vertically spaced above the top and provided with a plurality of apertures spaced lengthwise thereof, a carrier attachment for each carrier bar for carrying elongate articles thereacross, each carrier attachment comprising a bracket designed to be positioned at substantially the midpoint and overlying one aperture of said bridge portion, a pair of rigid keeper bars extending from the bracket in opposite directions over the bridge portion and pivotally mounted at their adjacent ends to the bracket for movement from a clamping position parallel to the bridge portion to an angular position elevated therefrom, means at the opposite ends of the keeper bars extending through other apertures in the bridge portion near its ends when the keeper bars are in clamping position and engageable with the edges of the apertures to lock the bars in clamping position, and means for detachably fastening the bracket to the bridge portion including a fastening element extending through the said one aperture of the bridge portion.

2. A carrier attachment according to claim 1 wherein the bracket has an aperture in registry with the said one aperture of said bridge portion and the fastening element extends through the registered apertures of the bracket and bridge portion for detachably fastening the carrier attachment to the bridge portion.

3. A carrier attachment according to claim 1 wherein, when the keeper bars are in clamping position, the side of each keeper bar opposite the bridge portion is spaced therefrom and an elongate yieldable body is attached to said side of the keeper bar and has a portion projecting therefrom toward the bridge portion substantially filling the space therebetween.

4. For attachment to a pair of unitary rigid article carrier bars for automobile tops which bars when mounted on an automobile top are in spaced parallel relation and extend transversely of the top, the bars having bridge portions intermediate their ends vertically spaced above the top and provided with a plurality of apertures spaced lengthwise thereof, a carrier attachment for each carrier bar for carrying elongate articles thereacross, each carrier attachment comprising a bracket designed to be positioned at substantially the midpoint and overlying one aperture of said bridge portion and having an aperture in registry with said one aperture, a pair of rigid keeper bars extending from the bracket in opposite directions over the bridge portion and pivotally mounted at their adjacent ends to the bracket for movement from a clamping position parallel to the bridge portion to an angular position elevated therefrom, a latch member at the opposite end of each keeper bar having a hooked end portion extending through another aperture in the bridge portion near its corresponding end when the keeper bar is in clamping position and toggle means connecting each latch to its keeper bar and operative to draw the hooked end portion of the latch into locking engagement with the edge of the aperture, and a fastening element extending through the registered apertures of the bracket and bridge portion for detachably fastening the carrier attachment to the bridge portion.

References Cited in the file of this patent

UNITED STATES PATENTS

| | | |
|---|---|---|
| D. 172,817 | Binding | Aug. 17, 1954 |
| 2,575,458 | Merrill | Nov. 20, 1951 |
| 2,630,257 | Nielsen | Mar. 3, 1953 |

FOREIGN PATENTS

| | | |
|---|---|---|
| 318,603 | Germany | Feb. 3, 1920 |